United States Patent
Yang et al.

(10) Patent No.: US 11,328,107 B2
(45) Date of Patent: May 10, 2022

(54) HYBRID MEASUREMENT AND SIMULATION BASED DISTORTION COMPENSATION SYSTEM FOR ADDITIVE MANUFACTURING PROCESSES

(71) Applicant: General Electric Company, Schenectady, NY (US)

(72) Inventors: Pinghai Yang, Niskayuna, NY (US); Tyler Nelson, Niskayuna, NY (US); Adegboyega Makinde, Austin, TX (US); Dean Robinson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 16/119,408

(22) Filed: Aug. 31, 2018

(65) Prior Publication Data

US 2020/0074028 A1 Mar. 5, 2020

(51) Int. Cl.
*G06F 30/23* (2020.01)
*B33Y 50/00* (2015.01)
(Continued)

(52) U.S. Cl.
CPC .............. *G06F 30/23* (2020.01); *B33Y 50/00* (2014.12); *G06F 2111/10* (2020.01); *G06F 2111/20* (2020.01); *G06F 2119/18* (2020.01)

(58) Field of Classification Search
CPC ......... B33Y 50/00; B33Y 50/02; B33Y 99/00; G06F 30/23; G06F 2111/10; G06F 2111/20; G06F 2119/18
See application file for complete search history.

(56) References Cited

U.S. PATENT DOCUMENTS 6,681,145 B1 * 1/2004 Greenwood ........... B25J 9/1692
700/176
8,737,707 B2 5/2014 Pearlstein et al.
(Continued)

FOREIGN PATENT DOCUMENTS

DE 102015207216 A1 * 12/2016 ............. G01B 11/24

OTHER PUBLICATIONS

Schreiber, Rob. "Matlab-Scholarpedia" Scholarpedia, 2007, p. 2 [online], [retrieved on Apr. 6, 2021]. Retrieved from the Internet <URL:www.scholarpedia.org/article/MATLAB> doi:10.4249/scholarpedia.2929 (Year: 2007).*
(Continued)

*Primary Examiner* — Kibrom K Gebresilassie
(74) *Attorney, Agent, or Firm* — Dority & Manning, P.A.

(57) ABSTRACT

A method and system, the method including receiving a nominal computer-aided design (CAD) model of a component; producing a physical representation of the component based on the CAD model using an additive manufacturing (AM) process; measuring the produced physical representation of the component to obtain measurement data of the physical representation of the component; determining a deviation between a geometry of the CAD model and the measurement data of the physical representation of the component; calculating a nonlinear scale factor using an iterative simulation process; determining a compensation field based on the determined deviation between the geometry of the CAD model and the measurement data of the physical representation of the component and the calculated nonlinear scale factor; modifying the nominal CAD model by the determined compensation field; and producing a physical representation of the component based on the modified nominal CAD model.

20 Claims, 4 Drawing Sheets

(51) Int. Cl.
*G06F 119/18* (2020.01)
*G06F 111/20* (2020.01)
*G06F 111/10* (2020.01)

(56) References Cited

U.S. PATENT DOCUMENTS

| | | | |
|---|---|---|---|
| 9,751,262 B2 | 9/2017 | Graham et al. | |
| 9,950,476 B2* | 4/2018 | Nguyen | B29C 64/393 |
| 2014/0222373 A1* | 8/2014 | Sprenger | G01B 5/008 |
| | | | 702/155 |
| 2015/0004046 A1* | 1/2015 | Graham | B22F 10/30 |
| | | | 419/53 |
| 2015/0153728 A1* | 6/2015 | Eckley | G05B 19/401 |
| | | | 700/97 |
| 2016/0016255 A1 | 1/2016 | Bruck et al. | |
| 2016/0086376 A1 | 3/2016 | Tang et al. | |
| 2016/0243644 A1* | 8/2016 | Moneta | B22F 10/20 |
| 2017/0232515 A1 | 8/2017 | DeMuth et al. | |
| 2017/0337307 A1 | 11/2017 | Oancea et al. | |
| 2017/0368753 A1 | 12/2017 | Yang et al. | |
| 2018/0071868 A1 | 3/2018 | Goehler et al. | |
| 2019/0054700 A1* | 2/2019 | Chandar | B33Y 50/02 |
| 2019/0099951 A1* | 4/2019 | Zhang | G06T 19/20 |
| 2020/0074028 A1* | 3/2020 | Yang | G06F 30/23 |
| 2020/0223146 A1* | 7/2020 | Totzeck | B22F 10/10 |
| 2020/0398379 A1* | 12/2020 | Reznik | G06F 30/23 |
| 2021/0299962 A1* | 9/2021 | Qian | G06F 30/20 |
| 2021/0386331 A1* | 12/2021 | Hossein Yazdi | A61B 5/1486 |
| 2021/0387244 A1* | 12/2021 | Phillips | B21D 53/06 |

OTHER PUBLICATIONS

Bayerlein, F., et al. "Improving cost effectiveness in additive manufacturing-increasing dimensional accuracy in laser beam melting by means of a simulation supported process chain." (TUM, 2015) ANSYS Conf. & 33. CADFEM Users M. 2015. <http://www.cae-wiki.info/wikiplus/images/d/d4/UM2015-2.02.12.pdf> (Year: 2015).*

Schmutzler, Christoph, Fabian Bayerlein, Stephan Janson, Christian Seidel, and Michael F. Zaeh. "Pre-compensation of warpage for additive manufacturing." (David Pub., 2016) Journal of Mechanics Engineering and Automation 6, No. 8 (2016): 392-399. doi: 10.17265/2159-5275/2016.08.002 (Year: 2016).*

Jin, Yuan et al., "Out-of-Plane Geometric Error Prediction for Additive Manufacturing," 2015 IEEE International Conference on Automation Science and Engineering (CASE), Gothenburg, Aug. 24-28, 2015, (pp. 918-923, 6 total pages).

Wang, Xiaolong et al., "Three-Dimensional Finite Element Analysis with Clamping in Wire and Arc Additive Manufacturing," 2016 European Modelling Symposium (EMS), Pisa, Nov. 28-30, 2016, DOI: 10.1109/EMS.2016.27, (pp. 104-108, 5 total pages).

Christoph Schmutzler et al., "Pre-compensation of Warpage for Additive Manufacturing", Journal Of Mechanics Engineering And Automation, vol. 6 No. 8, Aug. 28, 2016, pp. 392-399.

Shukri Afazov et al., "Methodology and Validation of Rapid Prediction of Distortion for Powder-Bed Additive Layer Manufacture", NAFEMS World Congress 3rd International Conference On Simulation Process And Data Management 11-14th, Jun. 14, 2017, pp. 1-12.

* cited by examiner

FIG. 4

HYBRID MEASUREMENT AND SIMULATION BASED DISTORTION COMPENSATION SYSTEM FOR ADDITIVE MANUFACTURING PROCESSES

BACKGROUND

The present disclosure relates, generally, to additive manufacturing processes and, more specifically, to a hybrid additive manufacturing process and system including both measurement-based and simulation-based techniques.

Additive manufacturing (AM) processes may be used to fabricate precision three-dimensional components from a digital model. Such components can be fabricated using an additive process, where successive layers of material are solidified one on top of the other. A growing trend of AM is moving from prototyping to tooling applications and complex end-use part production. For example, metal powder-bed AM processes have grown more than 50% since 2014, driven by the advantages of AM and enabling on-demand manufacturing.

A fundamental challenge that remains to be solved in metal powder-bed AM is distortion mitigation. The impact of distortion during an AM process, which is caused by one or more of rapid solidification rates, severe temperature gradients, and temperature-dependent phase transformation, is that multiple (e.g., five or more) iterations of compensation is often required before a computer-aided design (CAD) model can be turned into a geometrically relevant part. Unfortunately, so many iterations typically required a timeframe of months to produce the geometrically relevant part.

Therefore, it is desirable to provide a system and a method addressing the foregoing issues that can produce geometrically relevant parts from a CAD design model that efficiently and accurately compensates for distortions in AM processes.

DESCRIPTION OF THE DRAWINGS

These and other features and aspects of embodiments of the present disclosure will become better understood when the following detailed description is read with reference to the accompanying drawings, in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In some aspects, iterative compensation approaches and procedures may be classified into two major types, measured data based approaches and simulation data based approaches. Each of these types of approaches however have their own disadvantages. For example, in order to capture part distortions, measured data-based methods are a time-consuming and expensive process, that includes building a physical part, post-processing heat treatment of the part, part removal from a build plate, accurate measuring of the produced part to obtain measurement data of the part, and measurement data processing. The measurement data-based methods may not capture internal aspects in structures with internal surfaces. On the other hand, although many high-fidelity physical models/simulation engines have recently been developed, some simulation data-based methods are not always sufficiently accurate to capture all of the local distortions needed to fine-tune a compensated CAD model sufficiently for AM processes.

In some embodiments of the present disclosure, systems and methods are disclosed that address and overcome at least some of the above disadvantages. In particular, some aspects of the present disclosure include a hybrid compensation approach that uses both measured data and simulation data in AM processes.

In some aspects regarding an AM type of manufacturing, a CAD model may be used as a basis for producing a physical component. However, when a product of the AM process is printed, it is often warped or otherwise distorted, at least in part, from the dimensions of the CAD model due to one or more factors (e.g., thermal distortion, etc.). A traditional AM process might include printing a component based on a CAD model design, measuring the produced (i.e., printed) component to obtain measurement data including a deviation between the printed physical component and the ideal CAD model of the component, morphing (i.e., changing) a geometry of the CAD model based on the measurement data by inversing the measured deviation and applying it to the CAD model to get a compensated geometry, submitting the morphed CAD model to the AM printing process, and repeating the preceding operations for several iterations in an effort to produce the component with acceptable residual geometric error(s), wherein each iteration might each take upwards of a week's time.

In some aspects, Applicant(s) herein have realized that components produced by AM processes oftentimes do not respond in a linear manner to distortion compensation. In some instances, a component, or portions thereof, may have a tendency to over-/under-compensate in response to a morphing procedure. For example, if a component is being morphed to compensate for some distortion (e.g., 1 mm), portions of the subject component might change more the desired 1 mm while other portions of the component might respond by changing less than the desired 1 mm. That is, a component or portions thereof might not change the same (i.e., linearly).

In some embodiments, a process and system herein uses computer-based simulations, as opposed to physical manufacturing of parts, for each iteration to reduce the time required to produce geometrically relevant components. In some aspects, the present disclosure provides a system and process that uses computer-based simulations as a basis for determining or calculating a nonlinear scale factor map that can be used in an AM process, wherein iterations of input geometries and responses thereto are virtually (i.e., digitally) performed to calculate and capture nonlinear scale factors across the surface(s) of a component. In response to having calculated nonlinear scale factors across or over the component based on the virtual iteration builds, a system and process herein can determine where to apply more/less of a deviation at the time of producing (e.g., printing or otherwise building) the component. In some technical aspects, the systems and processes disclosed herein improve AM processes and systems by, for example, reducing cost(s) of manufacturing and reducing machine time.

In some embodiments, a subject component is printed an initial time and measured for deviations from a CAD model design of the component. Measurement data including the deviations from the CAD model design are used in combination with a calculated nonlinear scale factor map determined from a simulation-based process that indicates where to morph (i.e., change) the component's design more/less to get, upon printing, the desired component dimensions in fewer physical builds.

Figure 1:
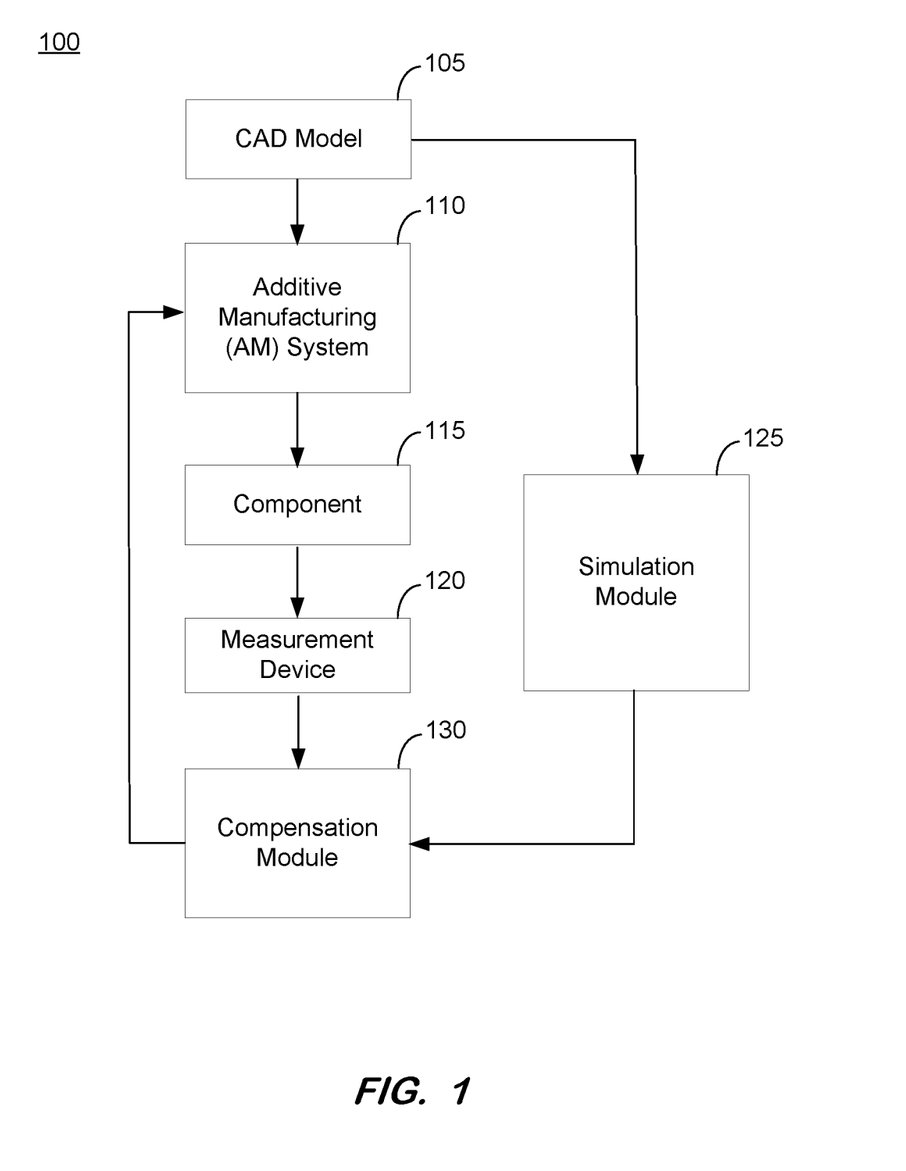
FIG. 1 is an illustrative example of a schematic block diagram of a system, according to some embodiments.

FIG. 1 is an illustrative example of a schematic block diagram of a system 100, according to some embodiments herein. In some embodiments, system 100 might implement process 200 and 300 shown in FIGS. 2 and 3, respectively. However, processes disclosed herein (e.g., processes 200, 300, and other processes herein) may be performed using any suitable combination of hardware (e.g., circuit(s)), software, and combinations thereof. In one embodiment, system 100 is configured to implement processes herein such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

System 100 receives a CAD model design that specifies geometric features and dimensions of a subject component to be produced by a AM system and process herein. In some instances, CAD model 105 may be converted or otherwise (pre-)processed to convert a nominal CAD geometry to a desired format suitable for processing and import thereof by other devices and modules of system 100. System 100 includes an AM system 100 that is capable of producing a physical representation (i.e., component 115) based on the CAD model design. The production of the component 115 by AM system 110 might include post-processing of the printed component. Component 115 is measured by a measurement device 120 to obtain measurement data of the physical component produced by AM system 110. In some embodiments, a coordinate measuring machine (CMM), x-ray, computed tomography (CT), and other precision imaging and measuring systems may be used to obtain the measurement data corresponding to the physical component 115 produced by AM system 110.

System 100 further includes a simulation module 125 to calculate a nonlinear scale factor map using simulation modeling processes. In some embodiments, a simulation herein might not, at least initially, be completely accurate. The measurement data may contribute to or otherwise be used to improve the accuracy of the simulation where a lack of accurate data may make the simulation not as accurate as desired or potentially possible. That is, in some embodiments the measurement data may be used to improve the accuracy of the simulation modeling and other processes herein.

In some embodiments, simulation module 125 might use finite element analysis (FEA) to determine the nonlinear scale factor map based on a virtual/digital iterative process including simulated part distortion and input geometry morphing for a component to be produced by system 100. In some embodiments, the iterative simulations executed by simulation module 125 may be performed before or in parallel with the physical build and measure operations of component 115 performed by AM system 110 and measurement device 120.

A compensation module 130 operates to determine a compensation field based on a deviation between the geometry of CAD model 105 and physical component 115 determined based on the measurement data produced by measurement device 120 and also based on the nonlinear scale factor map generated by simulation module 125. The nominal CAD model 105 may be modified based on the compensation field determined by compensation module 130 and used by AM system 110 to produce a component that is accurately corresponds to the CAD model 105.

Figure 2:
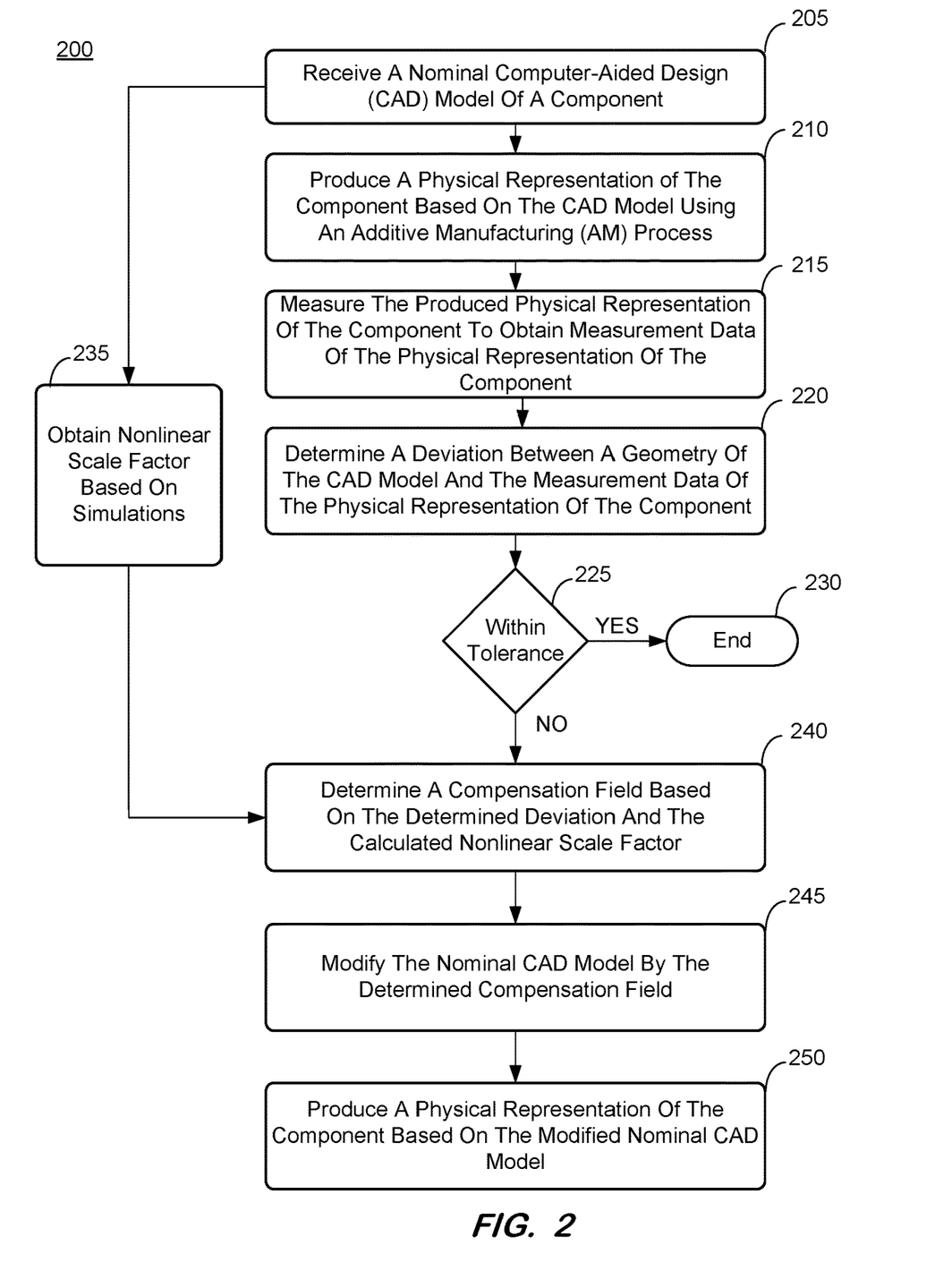
FIG. 2 is an illustrative flow diagram of a process, according to some embodiments.

FIG. 2 is an illustrative depiction of a process 200, in accordance with some embodiments herein. Initially, at operation 205, a nominal computer-aided design (CAD) model of a component to be manufactured via an AM process is received by a geometrical compensation module 106.

In some instances, the geometry of the nominal CAD model geometry received at operation 205 may comprise (Boundary Representation (B-rep) or Constructive Solid Geometry (CSG) data and may be converted to a ".stl" format (stereolithography file format), or any other suitable secondary format, where the secondary format is different from the original file format, for further processing in process 200. Conventionally, B-rep and CSG may be methods for representing shapes in solid modeling. Stereolithography format files may describe only the surface geometry of a three-dimensional object using triangular mesh without any representation of color, texture or other common CAD model attributes, and may be a more desirable file format for rapid prototyping. In some embodiments, the nominal CAD model in the ".stl" format may be used by an AM system (e.g., FIG. 1, 110) to build a physical component. In some embodiments, the nominal CAD model received at operation 205 might not be converted to another format prior to transmission to an AM system.

At operation 210, a physical representation of the component is produced using an AM process. Process 200 then proceeds from operation 210 to operation 215 where the physical component produced by the AM system is measured via a measurement device to capture measurement data including the geometry of at least one of the external and/or internal surface of the physical component. The measurement device may be a CMM, an X-ray, CT system, or any other suitable inspection/measurement device. In some embodiments, the measurement data may be point-cloud coordinate data. In one embodiment, the point-cloud coordinate measurements may be transformed (e.g., via post-processing at the AM system) into triangular-mesh data.

At operation 220, a deviation between a geometry of the CAD model used to produce the physical component and the measurement data of the physical component obtained at operation 215 is determined. The determined deviation is further evaluated at 225 to ascertain whether the initial physical component produced by the AM system is accurately produced, within acceptable tolerances, as determined for an execution of process 200.

In the event the initially produced physical component is determined to be acceptable (i.e., meeting or exceeding design geometrical criteria), then process 200 may terminate at 230 without further refinements to the physical component.

In the event the initially produced physical component is determined not to be acceptable at decision point 225, then process 200 may proceed as further illustrated to modify the CAD model design so that a sufficiently accurate physical component can be produced by the AM system. Referring still to FIG. 2, a nonlinear scale factor may be produced at operation 235 based on iterative simulated (i.e., digital or virtual) builds, including simulated part distortions, morphing or changing of the input geometry, and generating further simulated part distortions based on the morphed input geometry. In one embodiment, an initial iteration in determining the nonlinear scale factor of operation 235 may use the CAD model design received at operation 205 as the initial input geometry in a simulation. In some aspects, the generation of the nonlinear scale factor map at operation 235 may be performed before or in parallel with the build and measure operations 210-220.

In some aspects herein, a scale factor generated by a simulation process herein may also be referred to as a scale factor map since, in some implementations, the scale factor may be represented as a visualization of the surface of a corresponding component including, for example, scale values, colors, and/or other relative indicators of a scale factor at a specific portion or region of the component being produced.

At operation 240, the nonlinear scale factor map and the measurement data may be used to determine a compensation field. In one embodiment, a vector field may be determined derived from measured errors across a surface of the component. In one or more embodiments, the deviation may be represented as a set of column vectors. In some embodiments, the set of column vectors may include six column vectors (x, y, z, dx, dy, dz), including nominal vectors (i.e., x, y, z) and the displacement vectors (i.e., dx, dy, dz) for the difference between the nominal CAD model and the physical component. In some embodiments herein, the nonlinear scale factor from operation 235 may be appended to each of the measurement data based vectors to obtain a vector set including seven (7) components (e.g., (x, y, z, dx, dy, dz, and scale factor)).

Continuing with process 200, the compensation field determined at operation 240 may be used to modify or morph the nominal CAD model at operation 245. The modified nominal CAD model may then be used by the AM system used to produce the initial physical component and emulated in the simulations of operation 235 to produce a physical representation of the modified nominal CAD model.

In some aspects, process 200 might avoid multiple (e.g., four, five, or even more) physical build iterations of a physical part seen in prior techniques before a final physical representation of the component is produced and instead includes one physical build of the component and other multiple simulated (i.e., virtual/digital) builds. In some aspects, some processes herein may be viewed as a hybrid process including measurement data features and simulation based features that cooperatively provide an efficient, accurate, and dynamic AM system and process.

In some embodiments, multiple simulation-based iterations may be executed by operation 235 to determine an average amount of compensation for each area or portion of a component to be manufactured to determine average responses over the surfaces of the component geometry based on an arbitrary or multiple different manipulations of the coordinates on that geometry.

In some embodiments, a nonlinear scale factor map generated by the simulation operation of 235 might be multiplied by the actual deviation determined by the measurement data to determine the areas of a component to be manufactured that should be morphed more/less based on the simulations.

In some embodiments, the measured data of operation 215 and the nominal CAD model geometry from 205 may be super-imposed within a point data pre-processing software (e.g., Imageware®, Polyworks® and Geomagic®) to achieve a best fit/feature based alignment of the measured data and the nominal CAD model prior to calculating the deviation at operation 220.

In one or more embodiments, discrete vectors (e.g., compensated geometry) may be approximated and extrapolated by a continuous analytical function, such as a Basis (B)-spline hyper-patch to calculate the compensation field. Other suitable analytical functions may be used (e.g., discontinuous, polynomial, distance-based function, inverse function) to calculate the compensation field at any point in the space. In one embodiment, a discontinuous analytical function may be used, for example, in an instance where the component has multiple hyper-patch surface to abruptly transition from one surface to another. In some embodiments, the approximation and extrapolation may be performed by a multi-level B-spline morphing process.

Referring again to FIG. 2 and in particular to operation 245, the nominal CAD model is modified by the compensation field determined at operation 240. In some embodiments, the overall modified shape of the component may be larger than the nominal shape to account for some expected shrinkage. In some embodiments, the modified shape may include one or more regions that are larger than the nominal shape and one or more regions that are smaller than the nominal shape (i.e., nonlinearity). The regions that are larger than the nominal shape may account for expected shrinkage, while regions that are smaller than the nominal shape may account for regions that expand due to the stress of the AM process. In one or more embodiments, the nominal CAD model (e.g., nominal triangular mesh) may be modified by the compensation field (e.g., represented by tri-variate B-spline hyper-patch) to have a modified shape. In one or more embodiments, the nodes or points may be moved from a first position in the nominal CAD model to the modified position (e.g., second position) per the compensation field to achieve the modified shape. Process 200 concludes with a production of a physical representation of the component based on the modified nominal CAD model at operation 250.

Figure 3:
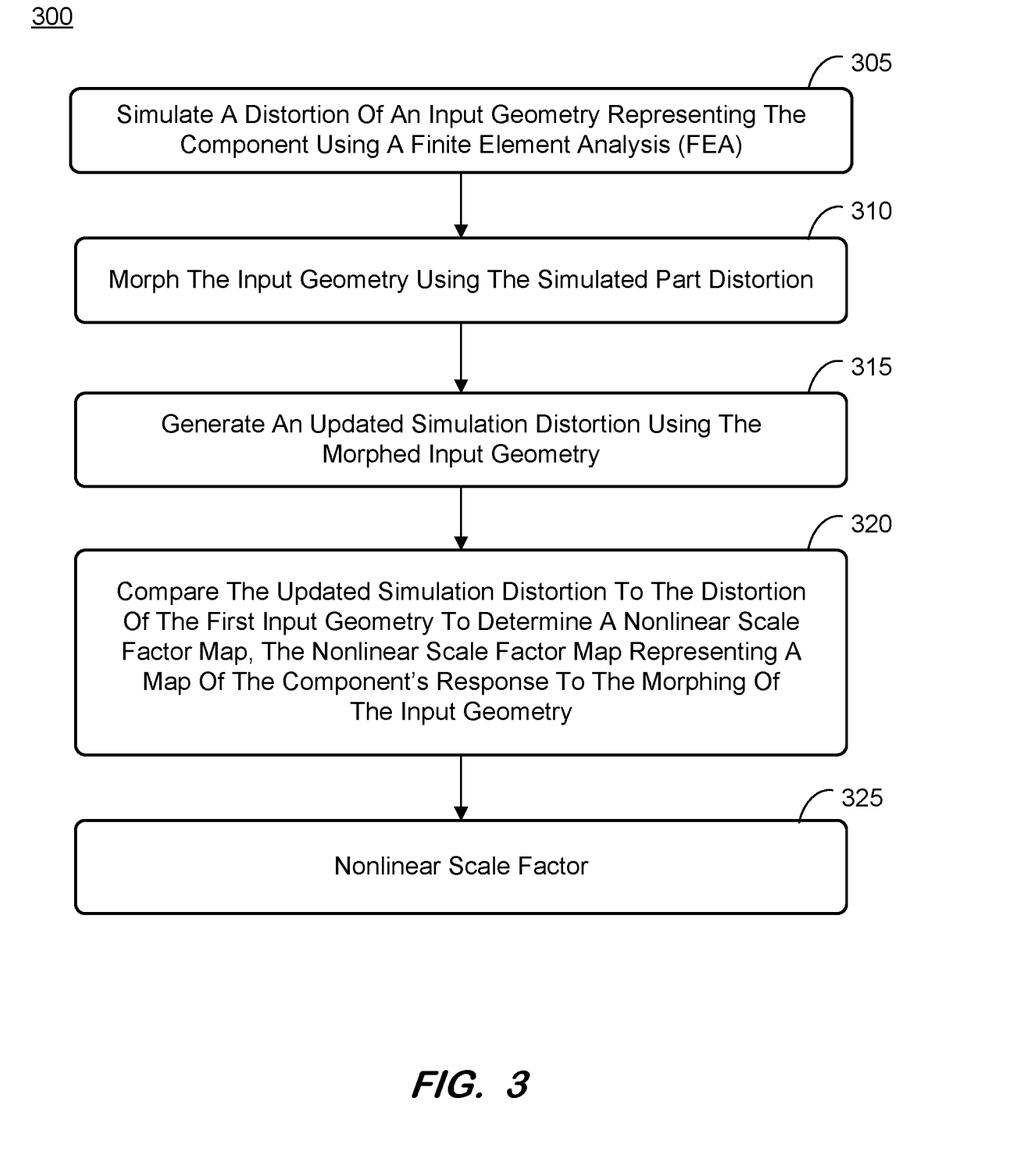
FIG. 3 is an illustrative flow diagram of a process, according to some embodiments.

FIG. 3 is an illustrative flow diagram of an example embodiment of a process 300 to calculate a nonlinear scale factor map (e.g., by simulation module 125 of FIG. 1 and the simulations of operation 235 in FIG. 2). In some instances, process 300 may be implemented or otherwise executed before or in parallel to the physical build and measure aspects of process 200, including operations 210-220. In some embodiments, process 300 may be implemented by a device, service, system, and combinations thereof executing program instructions by one or more processing units.

In some embodiments, process 300 may receive an input geometry (e.g., a CAD model design) representing a component at operation 305 while, for example, other processes (e.g., process 200) prepare and/or build and post-process a physical representation of the component specified in the CAD model design. Process 300 may execute one or more iterations thereof in a virtual/digital context to, at least, predict a distortion or warpage to a part and a response thereto to obtain a nonlinear scale factor map. The simulation-based nonlinear scale factor map generated (i.e., output) by process 300 may be further used in combination with measurement-based data determinations in an AM process (e.g., FIG. 2, process 200) or system (FIG. 1, system 100) to efficiently produce a physical representation of a component that accurately corresponds to a CAD model of the component. The input geometry representing a component received at operation 305 may be used by an AM simulation process to simulate a distortion of the input geometry. In some embodiments, the simulation may be accomplished using FEA technique(s). FEA software may be used to implement the simulation, including for example, ANSYS®, GeonX®, Autodesk® Netfabb®, and other engineering and simulation software packages and products. In some instances, the input geometry used in a first iteration of process 300 is the geometry of a nominal CAD model of the component.

At operation 310, the input geometry is morphed or changed based on the simulated part distortion generated at operation 305. In some aspects, morphing the input geometry includes inverting the distortion. Having morphed the input geometry at operation 310, the morphed input geometry is subjected to a simulated AM process at operation 315 to obtain an updated simulation.

Proceeding to operation 320, process 300 then compares the updated simulation distortion to the distortion of the first input geometry to generate or otherwise determine a nonlinear scale factor map that represents a map of the component's response to the morphing of the input geometry. As mentioned above, the first input geometry in a first iteration of process 300 might be the input geometry of the nominal CAD model design.

In some embodiments, the operations of process 300 may be iteratively repeated multiple times to create an average nonlinear scale factor in response to a variety of instances of input geometry morphing operations, as a function of a residual error. Referring to FIG. 3, the average nonlinear scale factor is shown at 325.

As disclosed relative to the description of FIG. 2, the generated scale factor map may be appended to or otherwise combined with a vector set representing the deviation between the nominal CAD model and the physical representation of the content to be manufactured. As such, a vector set to be used to build a component by an AM system or process herein might include seven (7) components/attributes (x, y, z, dx, dy, dz, and scale factor).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
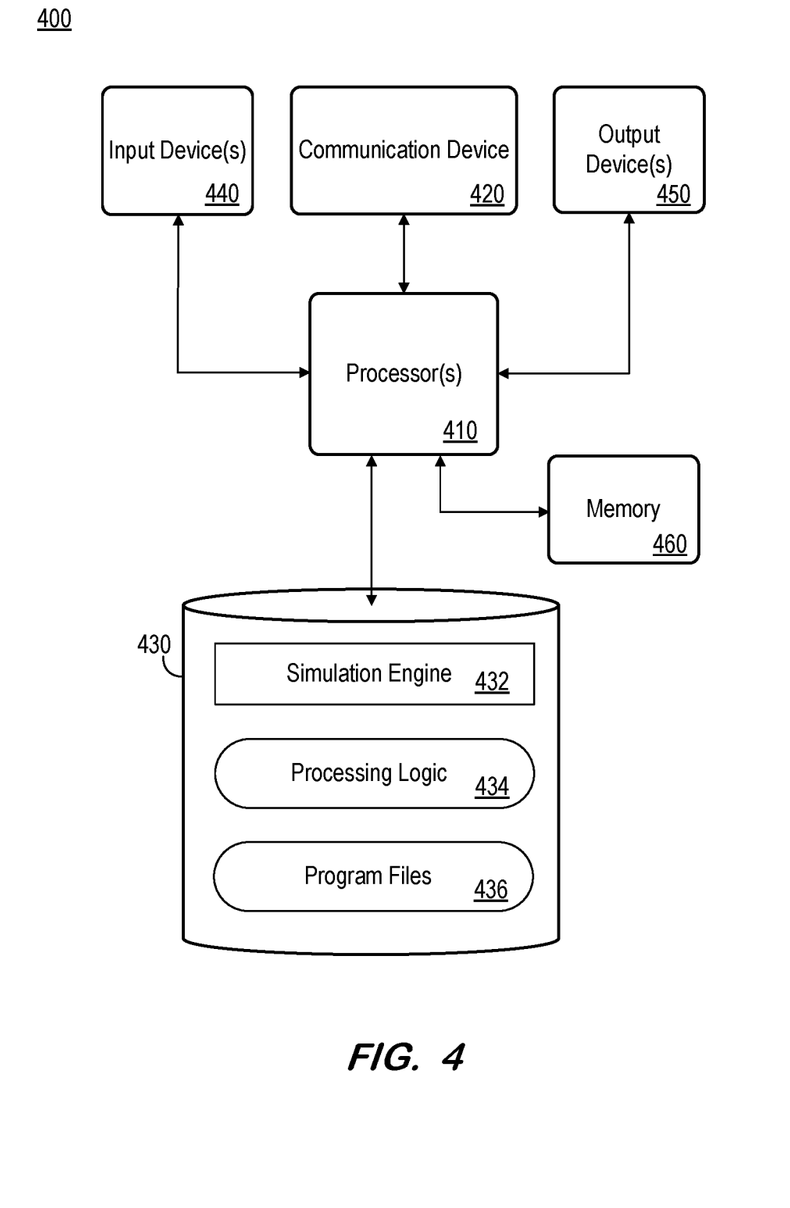
FIG. 4 is a block diagram of an apparatus, according to some embodiments.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

FIG. 4 is a block diagram of computing system 400 according to some embodiments. System 400 may comprise a general-purpose or special-purpose computing apparatus and may execute program code to perform any of the methods, operations, and functions described herein. System 400 may comprise an implementation of one or more systems (e.g., system 100) and processes (e.g., 200, 300). In some embodiments, system 400 may be configured to include a simulation module such as simulation module 125 to generate a nonlinear scale factor map as shown in FIG. 1. System 400 may include other elements that are not shown, according to some embodiments.

System 400 includes processor(s) 410 operatively coupled to communication device 420, data storage device 430, one or more input devices 440, one or more output devices 450, and memory 460. Communication device 420 may facilitate communication with external devices, such as a data server and other data sources providing access, for example, to a CAD model design repository and other systems, devices, and processing modules such as, for example, a compensation module (e.g., FIG. 1, 130). Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into system 400. Output device(s) 450 may comprise, for example, a display (e.g., a display screen to display a nonlinear scale factor map), a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise Random Access Memory (RAM), Storage Class Memory (SCM) or any other fast-access memory.

Simulation engine 432 may comprise program code executed by processor(s) 410 (and within the execution engine) to cause system 400 to perform any one or more of the processes described herein. Embodiments are not limited to execution by a single apparatus. Processing logic 434 may operate to further control processor 410 to effectuate the processes disclosed herein. Data storage device 430 may also store data and other program files 436 for providing additional functionality and/or which are necessary for operation of system 400, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

This written description uses examples to explain the disclosure, including the best mode, and also to enable any person skilled in the art to practice the disclosure, including making and using any devices or systems and performing any incorporated methods. The patentable scope of the disclosure is defined by the claims appended hereto, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a memory storing executable program instructions therein; and
   a processor in communication with the memory, the processor operative to execute the program instructions to:
   receive a nominal computer-aided design (CAD) model of a component;
   produce a first physical representation of the component based on the nominal CAD model using an additive manufacturing process;
   measure the first physical representation of the component to obtain measurement data of the first physical representation of the component;
   determine a deviation between a geometry of the nominal CAD model and the measurement data of the first physical representation of the component;
   calculate a nonlinear scale factor map using an iterative simulation process, wherein the nonlinear scale factor map comprises a map associating a plurality of locations of the CAD model to corresponding ones of a plurality of scale factors respectively representing an increase or a decrease in an amount of distortion compensation to be applied based at least in part on a simulated effect upon the component in response to the iterative simulation process;
   determine a compensation field indicating the amount of distortion compensation to be applied across at least a portion of the component, wherein the amount of distortion compensation corresponds at least in part to a multiplication product of (i) the deviation between the geometry of the nominal CAD model and the measurement data of the first physical representation of the component, and (ii) the nonlinear scale factor map;
   modify the nominal CAD model by the compensation field; and
   produce a second physical representation of the component based on the modified nominal CAD model.

2. The system of claim 1, wherein the measurement data of the first physical representation of the component is obtained from a surface of the first physical representation of the component and is point-cloud coordinate data.

3. The system of claim 1, wherein the deviation between a geometry of the nominal CAD model and the measurement data of the first physical representation of the component is represented as a set of column vectors.

4. The system of claim 3, wherein the nonlinear scale factor map is appended to the set of column vectors.

5. The system of claim 1, wherein the iterative simulation process comprises:
   (i) generating a nominal simulated distortion of a nominal input geometry representing the component using a numerical method;
   (ii) morphing the nominal input geometry using the nominal simulated part distortion, providing a morphed input geometry;
   (iii) generating an updated simulated distortion using the morphed input geometry;
   (iv) comparing the updated simulated distortion to the nominal simulated distortion to determine a respective iteration of the nonlinear scale factor map, wherein the respective iteration of the nonlinear scale factor map comprises a map of a simulated effect upon the component in response to a respective iteration of morphing the nominal input geometry; and
   repeating operations (i)-(iv) one or more times.

6. The system of claim 5, wherein the nominal input geometry in a first instance of operation (i) is the geometry of the nominal CAD model.

7. The system of claim 5, wherein the calculation of the nonlinear scale factor map using an iterative simulation process is executed, at least in part, before or in parallel with the producing of the first physical representation of the component; the obtaining of the measurement data of the first physical representation of the component; and the determination of the deviation between the geometry of the nominal CAD model and the measurement data of the first physical representation of the component.

8. The system of claim 5, wherein the numerical method comprises at least one of a finite element analysis and a boundary element method.

9. A method comprising:
   receiving a nominal computer-aided design (CAD) model of a component;
   producing a first physical representation of the component based on the nominal CAD model using an additive manufacturing process;
   measuring the first physical representation of the component to obtain measurement data of the first physical representation of the component;
   determining a deviation between a geometry of the nominal CAD model and the measurement data of the first physical representation of the component;
   calculating a nonlinear scale factor map using an iterative simulation process, wherein the nonlinear scale factor map comprises a map associating a plurality of locations of the CAD model to corresponding ones of a plurality of scale factors respectively representing an increase or a decrease in an amount of distortion compensation to be applied based at least in part on a simulated effect of the component in response to the iterative simulation process;
   determining a compensation field indicating the amount of distortion compensation to be applied across at least a portion of the component, wherein the amount of distortion compensation corresponds at least in part to a multiplication product of (i) the deviation between the geometry of the nominal CAD model and the measurement data of the first physical representation of the component, and (ii) the nonlinear scale factor map;

modifying the nominal CAD model by the compensation field; and producing a second physical representation of the component based on the modified nominal CAD model.

10. The method of claim 9, wherein the measurement data of the first physical representation of the component is obtained from a surface of the first physical representation of the component and is point-cloud coordinate data.

11. The method of claim 9, wherein the deviation between a geometry of the nominal CAD model and the measurement data of the first physical representation of the component is represented as a set of column vectors.

12. The method of claim 11, wherein the nonlinear scale factor map is appended to the set of column vectors.

13. The method of claim 9, wherein the iterative simulation process comprises:
(i) generating a nominal simulated distortion of a nominal input geometry representing the component using a numerical method;
(ii) morphing the nominal input geometry using the nominal simulated part distortion, providing a morphed input geometry;
(iii) generating an updated simulated distortion using the morphed input geometry;
(iv) comparing the updated simulated distortion to the nominal simulated distortion to determine a respective iteration of the nonlinear scale factor map, wherein the respective iteration of the nonlinear scale factor map comprises a map of a simulated effect upon the component in response to a respective iteration of morphing the nominal input geometry; and
repeating operations (i)-(iv) one or more times.

14. The method of claim 13, wherein the nominal input geometry in a first instance of operation (i) is the geometry of the nominal CAD model.

15. The method of claim 13, wherein the calculation of the nonlinear scale factor map using an iterative simulation process is executed, at least in part, before or in parallel with the producing of the first physical representation of the component; the obtaining of the measurement data of the first physical representation of the component; and the determination of the deviation between the geometry of the nominal CAD model and the measurement data of the first physical representation of the component.

16. The method of claim 13, wherein the numerical method comprises at least one of a finite element analysis and a boundary element method.

17. A non-transitory computer readable medium having executable instructions stored therein, the medium comprising:
instructions to receive a nominal computer-aided design (CAD) model of a component;
instructions to produce a first physical representation of the component based on the nominal CAD model using an additive manufacturing process;
instructions to measure the first physical representation of the component to obtain measurement data of the first physical representation of the component;
instructions to determine a deviation between a geometry of the nominal CAD model and the measurement data of the first physical representation of the component;
instructions to calculate a nonlinear scale factor map using an iterative simulation process, wherein the nonlinear scale factor map comprises a map associating a plurality of locations of the CAD model to corresponding ones of a plurality of scale factors respectively representing an increase or a decrease in an amount of distortion compensation to be applied based at least in part on a simulated effect of the component in response to the iterative simulation process;
instructions to determine a compensation field indicating the amount of distortion compensation to be applied across at least a portion of the component, wherein the amount of distortion compensation corresponds at least in part to a multiplication product of (i) the deviation between the geometry of the nominal CAD model and the measurement data of the first physical representation of the component, and (ii) the nonlinear scale factor map;
instructions to modify the nominal CAD model by the compensation field; and
instructions to produce a second physical representation of the component based on the modified nominal CAD model.

18. The medium of claim 17, wherein the iterative simulation process comprises:
(i) generating a nominal simulated distortion of a nominal input geometry representing the component using a numerical method;
(ii) morphing the nominal input geometry using the nominal simulated part distortion, providing a morphed input geometry;
(iii) generating an updated simulated distortion using the morphed input geometry;
(iv) comparing the updated simulated distortion to the nominal simulated distortion to determine a respective iteration of the nonlinear scale factor map, wherein the respective iteration of the nonlinear scale factor map comprises a map of a simulated effect upon the component in response to a respective iteration of morphing the nominal input geometry; and
repeating operations (i)-(iv) one or more times.

19. The medium of claim 18, wherein the nominal input geometry in a first instance of operation (i) is the geometry of the nominal CAD model.

20. The medium of claim 18, wherein the calculation of the nonlinear scale factor map using an iterative simulation process is executed, at least in part, before or in parallel with the producing of the first physical representation of the component; the obtaining of the measurement data of the first physical representation of the component; and the determination of the deviation between the geometry of the nominal CAD model and the measurement data of the first physical representation of the component.

* * * * *